(12) United States Patent
Rouse

(10) Patent No.: US 8,261,658 B1
(45) Date of Patent: Sep. 11, 2012

(54) PORTABLE OUTDOOR CLEANER AND STEAMER

(76) Inventor: Ross A Rouse, Kinston, NC (US)

( * ) Notice: Subject to any disclaimer, the term of this patent is extended or adjusted under 35 U.S.C. 154(b) by 385 days.

(21) Appl. No.: 12/728,175

(22) Filed: Mar. 19, 2010

Related U.S. Application Data

(60) Provisional application No. 61/177,526, filed on May 12, 2009.

(51) Int. Cl.
*A47J 27/04* (2006.01)
(52) U.S. Cl. .......................... 99/443 C; 99/407; 99/410
(58) Field of Classification Search ............... 99/407, 99/410, 443 C, 476–479, 474
See application file for complete search history.

(56) References Cited

U.S. PATENT DOCUMENTS

| | | | | |
|---|---|---|---|---|
| 4,582,047 A | * | 4/1986 | Williams | 126/369 |
| 4,644,857 A | * | 2/1987 | Buller-Colthurst | 99/335 |
| RE34,646 E | * | 6/1994 | Lapeyre et al. | 99/443 C |
| 5,351,607 A | * | 10/1994 | Rini et al. | 99/404 |
| RE35,259 E | * | 6/1996 | Williams | 126/369 |
| 5,570,626 A | * | 11/1996 | Vos | 99/404 |
| 6,009,798 A | * | 1/2000 | Ledet et al. | 99/443 C |
| 7,069,841 B2 | * | 7/2006 | Ledet et al. | 99/386 |
| 2004/0159245 A1 | * | 8/2004 | Ledet et al. | 99/417 |
| 2009/0092718 A1 | * | 4/2009 | Mendenhall et al. | 426/383 |

* cited by examiner

*Primary Examiner* — Raleigh W. Chiu
(74) *Attorney, Agent, or Firm* — Ishman Law Firm P.C.

(57) ABSTRACT

A portable outdoor cleaner and cooker for steaming foodstuffs such as shellfish includes an elongated housing having an internal conveyor that routes the foodstuffs past a water dispersing station for cleaning and subsequently through a steaming section for cooking.

5 Claims, 3 Drawing Sheets

PORTABLE OUTDOOR CLEANER AND STEAMER

RELATED APPLICATION

This application claims the benefit of U.S. Provisional Application No. 61/177,526 filed on May 12, 2009 in the name of Ross Andrew Rouse and entitled "Portable Continuous Process for Washing and Steaming Foods".

FIELD OF THE INVENTION

The present invention relates to an apparatus and process for the portable outdoor cooking of food, particularly seafood and vegetables.

BACKGROUND OF THE INVENTION

The outdoor cooking for large groups of people is extremely popular throughout the country, featuring the food specialties of geographic and ethnic groups. The grilling and barbequing of meats is well established and extensive and elaborate equipment is available for efficiently servicing groups of varying sizes. Other food categories are also popular, but equipment for the larger groups is extremely limited, primarily to labor intensive cleaning and cooking for seafood and vegetables.

While the meats are generally obtained in a prepared state ready for cooking without further preparation, seafood and vegetables are oftentimes personally furnished or directly obtained from the farmers or fishermen in their harvested uncleaned state. As such laborious individual cleaning of the food is required, particularly popular seafood such as oysters and shrimp. After cleaning a popular cooking method for the seafood and the vegetables is steam cooking. Because of the extensive manual handling and the need to transfer to separate cooking facilities, supplying the end product in a timely and consistent basis is difficult. Accordingly, it would be desirable to provide an improved efficient apparatus and method for the outdoor cleaning and cooking of these foodstuffs.

SUMMARY OF THE INVENTION

The present invention provides an improved portable outdoor cooking apparatus that cleans and steams foodstuffs such as shellfish thereby avoiding separate cleaning operations and equipment and provides a continuous supply of fully cleaned and cooked product to satisfy the appetites of large gatherings.

In one aspect, the invention provides a portable outdoor cleaner and cooker having an elongated enclosure with an internal cavity having an entry end and a discharge end, said cavity having a cleaning zone at said entry end and a cooking zone at said discharge end; a plurality of vertical legs for supporting said enclosure on an outdoor surface; a conveyor belt in said cavity of said enclosure extending between said entry end and said discharge end; an electric motor operatively connected with said conveyor belt and selectively operable to transfer food article thereon from said entry end to said discharge end; a water reservoir in said cavity beneath said conveyor belt in said cooking zone; a water supply and having a first branch line with a first outlet operable for maintaining a water level in said water reservoir, said water supply having a second branch line having spray outlets above and below said conveyor belt for clean said food articles, said second branch line having a control valve for selectively operating said spray outlets; drains in said cleaning zone and said cooking zone for removing water therefrom; an elongated gas burner supported by said legs and extending along said enclosure beneath said cooking zone; and a gas supply connected to said gas burner and operable to heat said water reservoir for generating steam in said cooking zone for cooking said food articles. The cooker may further have a movable barrier member in said cleaning zone and said cooking zone and operable for moving to an open position for allow passage of said food articles and for limiting interchange for water between said zones and passage of water from said entry end and passage of steam from said discharge end. The barrier may be a pivoting transverse door that is engaged and opened by said food article. The motor includes a controller for adjusting transit speed of said conveyor belt. The portable outdoor cleaner and cooker as recited in claim 1 including a side reservoir projecting from the side of the enclosure and fluidly communicating with said water reservoir, and a level switch disposed in said side reservoir for sensing the water level thereof and thereby said water reservoir level in said cooking zone and operable to control a valve in said second branch line to control water supply to said water reservoir and thereby maintain said level.

Accordingly, it is an object of the present invention to provide an outdoor apparatus for the cleaning and steaming of food products such as seafood.

Another object is to provide for the continuous outdoor preparation of seafood in a single operation.

A further object is to provide an outdoor cooker with a processing tunnel providing sequential cleaning and steaming of shellfish on a continuous basis.

BRIEF DESCRIPTION OF THE DRAWINGS

The above and other features and advantages of the present invention will become apparent upon reading the following description taken in conjunction with the accompanying drawings in which.

DESCRIPTION OF THE PREFERRED EMBODIMENT

Figure 1:
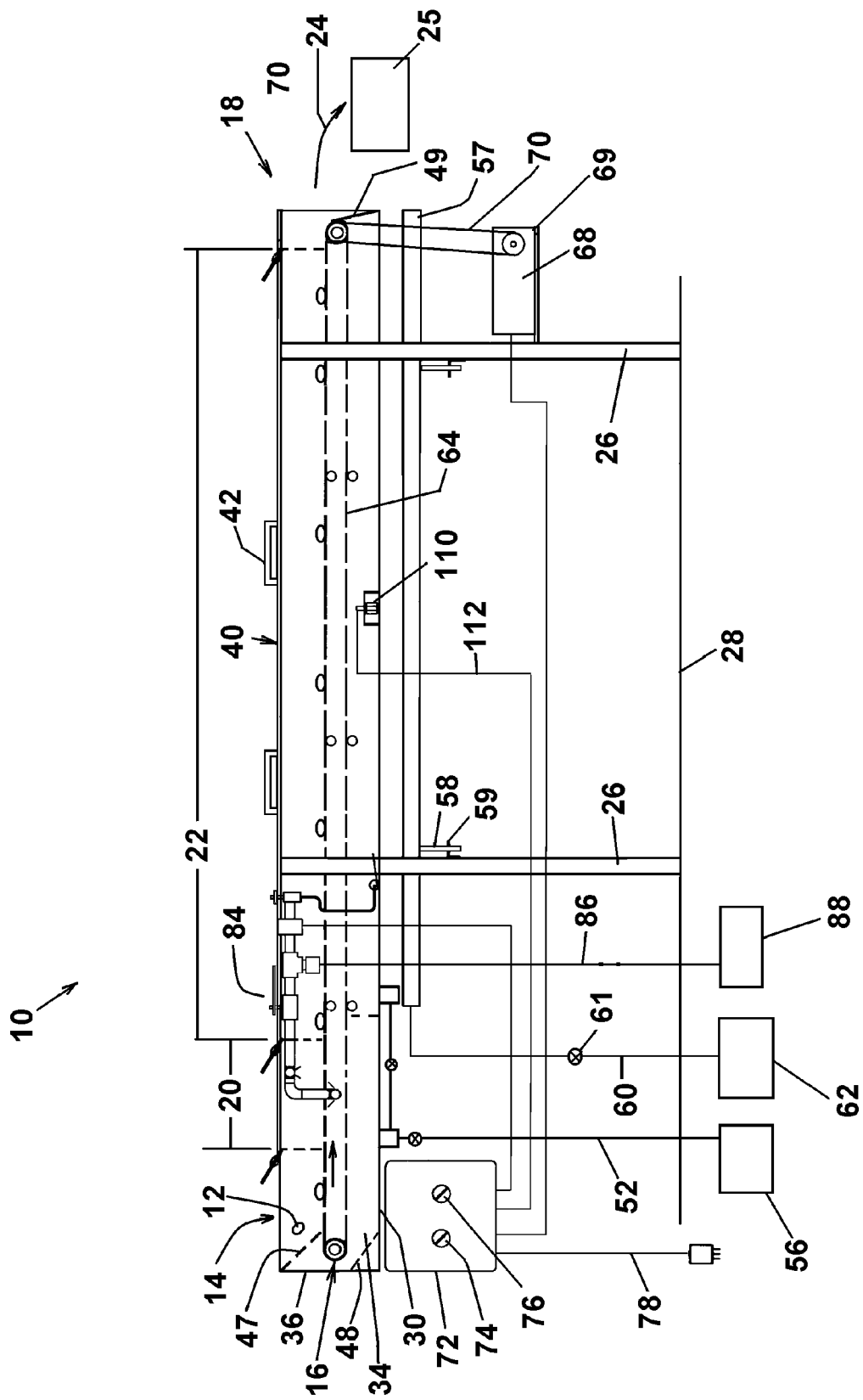
FIG. 1 is a side schematic view of a portable outdoor cleaner and steamer according to an embodiment of the invention.
Figure 2:
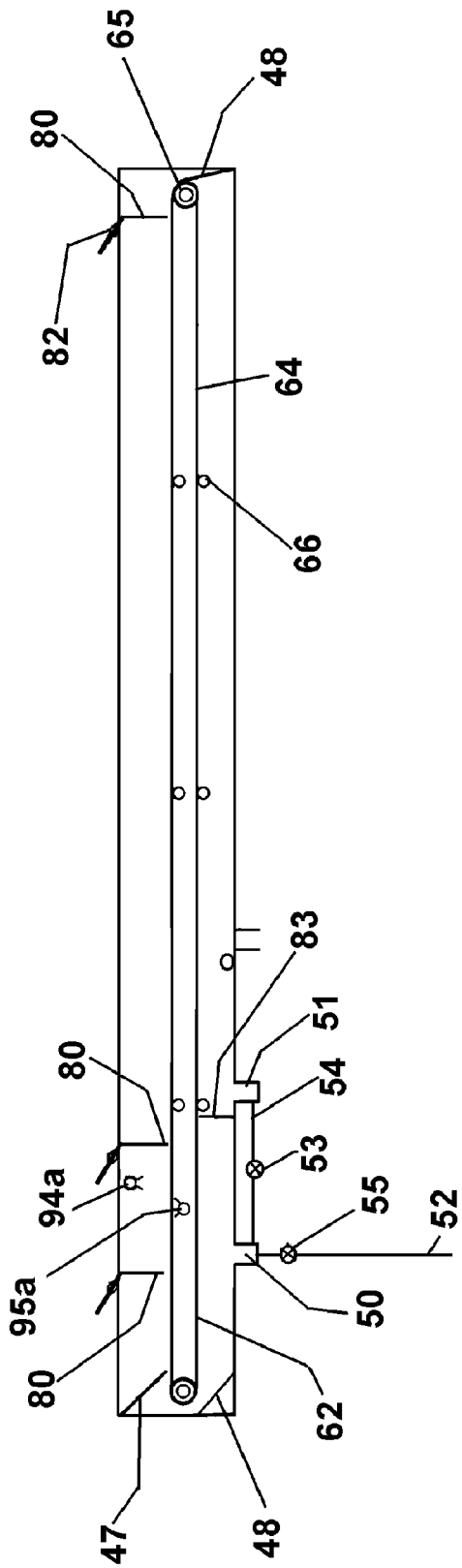
FIG. 2 is a side cross sectional schematic view of cleaner and steamer of FIG. 1.
Figure 3:
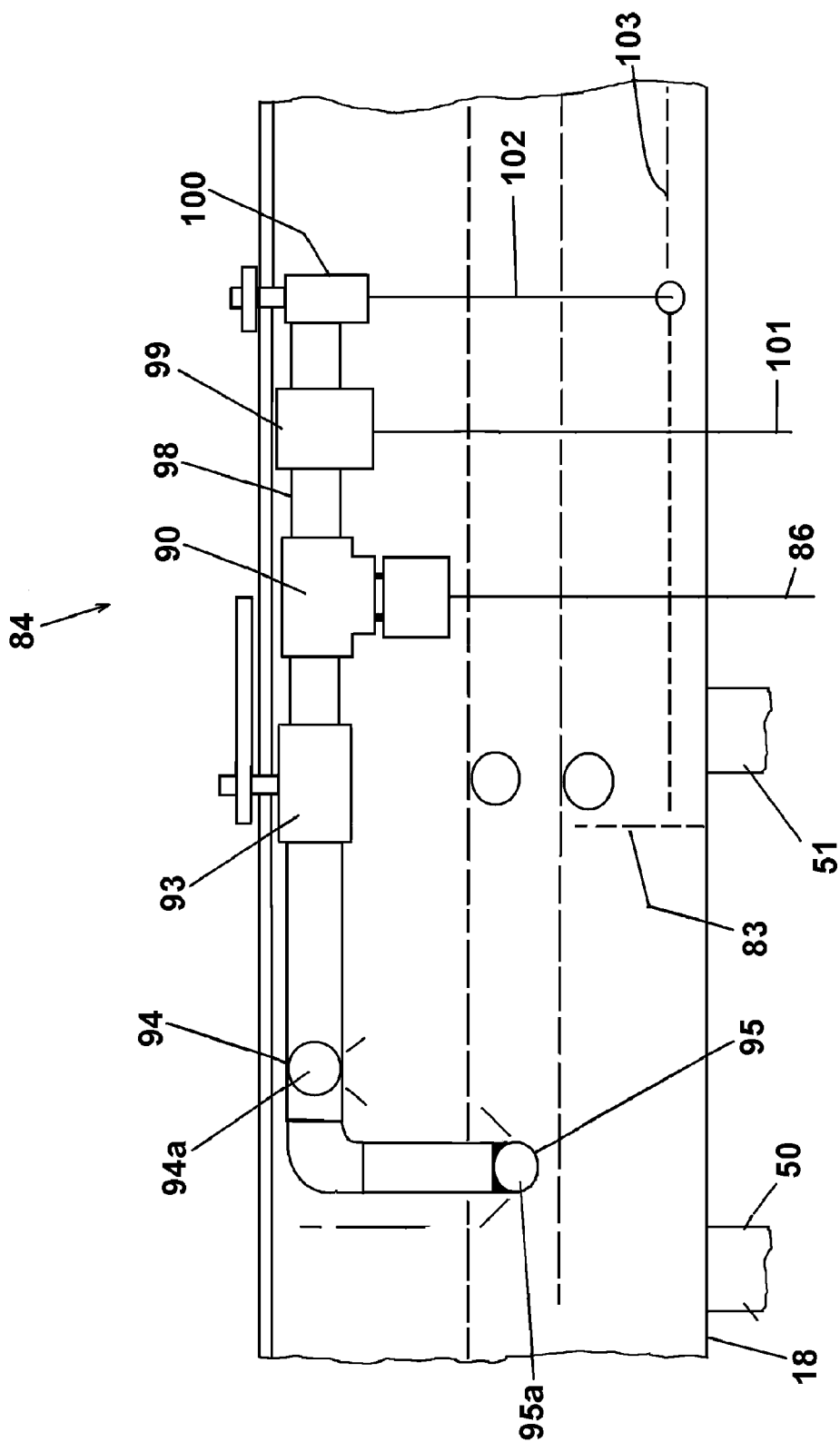
FIG. 3 is a fragmentary side schematic view showing the water supply system for the cleaner and steamer.

Referring to drawings, FIGS. 1 and 2 show a portable outdoor cleaner and steamer apparatus 10 for the continuous steam processing of foodstuffs, such as seafood and vegetables, and particularly shellfish. Food items 12 are continuously fed at a front entry 14 onto a conveyor 16 mounted in an enclosed tunnel in an elongated housing 18. The conveyor 16 continuously routes the food items 12 transfer through a cleaning section 20 and a steaming section 22 for discharge at a rear exit 24 into a suitable collection receptacle 25.

The elongated housing 18 is generally rectangular in cross sections and supported on legs 26 from a suitable platform 28, such as without limitation a ground location or a mobile platform. The legs 26 are attached in lateral pairs by welds or fasteners at longitudinally spaced locations to the side walls of the housing 18. The legs 26 may be provided with leveling devices or casters, not shown, for mobile support on a ground surface. The legs may also be fixedly attached to a platform on a trailer for towing behind a vehicle.

The housing 12 comprises a base 30 having a rectangular bottom wall 32 and laterally spaced side walls 34. The base 30 includes a split front end wall 36 providing an upwardly opening entrance port at the entry 14 and an open rear end providing a discharge port at the exit 24. A top plate 40 having lifting handles 42 is carried on the side walls 34 and extends longitudinally over the cavity from the rear end to a front location spaced slightly rearwardly from the front end wall 36, thereby providing an enclosed cooking and cleaning tunnel between the ports. The housing is preferably formed of a corrosion resistant material such as stainless steel, and has an envelope size of about 8 feet in length, 10 inches in width, and 10 inches in depth. The housing size may be adapted in size to provide other sizes dependent on the desired production rate and the food items being cooked. The split end wall 36 comprises a rearwardly inclined upper transverse plate 47 for guiding the food items onto the upper belt of the conveyor 16 and a rearwardly inclined lower transverse plate 48 extending below the lower belt of the conveyor. An appropriate cleaning tool may be inserted between the plate for assisting in removing dirt and debris from the cleaning zone. The exit port is provided downwardly and rearwardly inclined transverse plate 49 for guiding the food items at discharge.

The cleaning zone and the steaming zones 20, 22 are provided with drains 50, 51, respectively, for discharging the liquids therefrom. The drain 50 from the cleaning zone is directly connected to a drain line 52. The drain 51 from the cooking zone is connected to drain line 52 by branch line 53. The branch line 53 includes control valve 54 for enabling selective draining of the water in the cooking zone. The main drain line 52 may include a main drain valve 55 leading to a drain reservoir 56 that may be a ground surface or part of the waste water disposal system for the attendant property.

A stainless steel ribbon burner 57 is supported by adjusting screws 58 below the steaming section 22 of the enclosure 18 on crossbars 59 connected between the legs 26. The burner 57 is connected by line 60 including control valve 61 to a portable fuel tank 62, preferably low pressure propane.

The conveyor 16 includes a stainless steel mesh-type conveyor belt 64 supported at opposed ends by sprocketed end shafts 5 and at spaced intermittent locations by cross bars 66. The conveyor belt 64 is powered by a variable speed gearmotor 68 supported by brackets 69 on the rear set of legs 26 below the burner 57. The gearmotor 68 is operatively connected to the rear end sprockets by drive chain 70. Operation of the gearmotor 68 is controlled at a control panel 72 panel by operation of status and speed control switches 74, 76, respectively. The control panel 72 is connected by inlet line 78 to a suitable power supply.

The cleaning section 20 and the steaming section 22 are bounded by upper doors 80 that deflect to allow passage of the food items and thereafter swing closed to provide a barrier between the zones. Examples of such barriers, without limitation, are swinging flexible curtains, or as illustrated, pivotal transverse doors provided with counterweights 82 to offset the weight of the door. Accordingly, a front upper door 80 is provided at the front end of the disclosure at the entrance to the cleaning section 20, a middle upper door 80 between the sections, and a rear upper door at the rear end of the steaming section 22. A lower transverse plate or baffle 83 is positioned on the base of the housing slightly downstream of the middle upper door and serves as a lower barrier between the sections and a retaining wall for the steaming section water reservoir.

A water supply system 84 is carried on the front side of the enclosure and connected by a supply line 86, such as a conventional hose, at one end to a water supply 88 and at another end to a branch fitting 90. A cleaning line 92 including a control valve 93 is connected to the fitting and includes a transverse upper branch line 94 above the top run of the conveyor belt and a second transverse branch line 95 below the top run of the conveyor belt. Branch line. The upper branch line 94 is provided with one or more downwardly directed nozzles 96 for spraying and cleaning the top surface of the food passing thereby. The lower branch line in provided with one or more upwardly directed nozzles 97 for spraying and cleaning the bottom surface of the fool passing thereby.

A water supply line 98 extends rearwardly from the branch fitting and is serially connected with a steam solenoid valve 99 and a metering valve 100. The valve 99 is connected with the control panel by cable 101. A fill line 102 leads from the metering valve 100 and terminates with a discharge end for filling and maintaining in the cooking zone between the baffle and end plate a water level 103 as determined by a level switch 110 connected by cable 112 to the control panel 72 and thereby controlling operation of the solenoid valve 99. The level switch 110 is mounted in a side reservoir on the side of the enclosure that fluidly communicates with the water level 103.

Operation of the Portable Cleaner and Cooker

With the apparatus 10 connected to the power supply 78, water supply 88 and gas supply 62, the solenoid valve 99 is opened to fill the water chamber in the steaming section 22 to the water level 103 determined by the level switch 110. Thereafter, the ribbon burner 57 is ignited to bring the water to boiling. The conveyor 16 is operated to establish a belt speed providing a transit time through the steaming section sufficient to cook the selected food to the desired temperature. If washing is necessary for the food being processed, the control valve 93 for the cleaning section 20 is opened. When the operating parameters are stabilized, test food is loaded on the conveyor and passed through the cooking cycle. The speed of the conveyor belt 64 is thereafter raised or lowered to provide a transit time deemed preferable for the food. Thereafter, the food is delivered on demand to the belt, cooked and deposited in the collection receptacle 25 for serving. Upon completion of the cooking, the burner 57 is extinguished and the drain valves 54, 55 opened to drain water from the cooking zone through lines 53 and 52. Dirt and debris is directed by the tool for removal from the cleaning zone in drain line 50. The power supply, water line, and gas line are disconnected and the unit is ready for transport to storage or subsequent cooking location.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claim.

What is claimed:

1. A portable outdoor cleaner and cooker comprising:
   an elongated enclosure having an internal cavity having an entry end and a discharge end, said cavity having a cleaning zone at said entry end and a cooking zone at said discharge end;
   a plurality of vertical legs for supporting said enclosure on an outdoor surface;
   a conveyor belt in said cavity of said enclosure extending between said entry end and said discharge end;

an electric motor operatively connected with said conveyor belt and selectively operable to transfer food article thereon from said entry end to said discharge end;

a water reservoir in said cavity beneath said conveyor belt in said cooking zone;

a water supply and having a first branch line with a first outlet operable for maintaining a water level in said water reservoir, said water supply having a second branch line having spray outlets above and below said conveyor belt for cleaning said food articles, said second branch line having a control valve for selectively operating said spray outlets;

drains in said cleaning zone and said cooking zone for removing water therefrom;

an elongated gas burner supported by said legs and extending along said enclosure beneath said cooking zone; and a gas supply connected to said gas burner and operable to heat said water reservoir for generating steam in said cooking zone for cooking said food articles.

2. The portable outdoor cleaner and cooker as recited in claim 1 including a movable barrier member in said cleaning zone and said cooking zone and operable for moving to an open position for allow passage of said food articles and for limiting interchange for water between said zones and passage of water from said entry end and passage of steam from said discharge end.

3. The portable outdoor cleaner and cooker as recited in claim 2 wherein said barrier member is a pivoting transverse door that is engaged by said food article for allowing passage therepast.

4. The portable outdoor cleaner and cooker as recited in claim 1 wherein said motor includes a controller for adjusting transit speed of said conveyor belt.

5. The portable outdoor cleaner and cooker as recited in claim 1 including a side reservoir projecting from the side of the enclosure and fluidly communicating with said water reservoir, and a level switch disposed in said side reservoir for sensing the water level thereof and thereby said water reservoir level in said cooking zone and operable to control a valve in said second branch line to control water supply to said water reservoir and thereby maintain said level.

* * * * *